United States Patent

[11] 3,596,240

| [72] | Inventors | Carl E. Atkins<br>Montclair;<br>Edward Lennon, North Arlington, both of, N.J. |
|---|---|---|
| [21] | Appl. No. | 720,556 |
| [22] | Filed | Apr. 11, 1968 |
| [45] | Patented | July 27, 1971 |
| [73] | Assignee | Wagner Electric Corporation |

[54] ALARM CIRCUIT
2 Claims, 3 Drawing Figs.

[52] U.S. Cl. .................................................. 340/52 D,
315/129, 340/63
[51] Int. Cl. ..................................................... B60q 5/00,
G08b 3/10
[50] Field of Search ......................................... 315/77, 83,
129; 340/52, 64, 249, 274, 332, 384 E

[56] References Cited
UNITED STATES PATENTS

| 3,283,299 | 11/1966 | Savino | 340/52 |
| 2,799,843 | 7/1957 | Savino | 340/52 D |
| 3,325,783 | 6/1967 | Webb | 340/52 D |

OTHER REFERENCES
GE Transistor Manual, Sixth Edition, pp. 74 & 75

Primary Examiner—John W. Caldwell
Assistant Examiner—Robert J. Mooney
Attorney—Eyre, Mann and Lucas ABSTRACT: An alarm circuit for passenger vehicles sets off an audible signal only when the ignition switch is open, the parking lamps are turned on, and the door switch is closed (door open). The circuit may include a free running multivibrator in which case there are no make and break contacts to produce a spark. The alarm may be arranged to operate only when the left door is opened. Other auxiliary facilities such as a radio set, a heater, or air conditioning motor may be added to the parking lamps to sound the alarm.

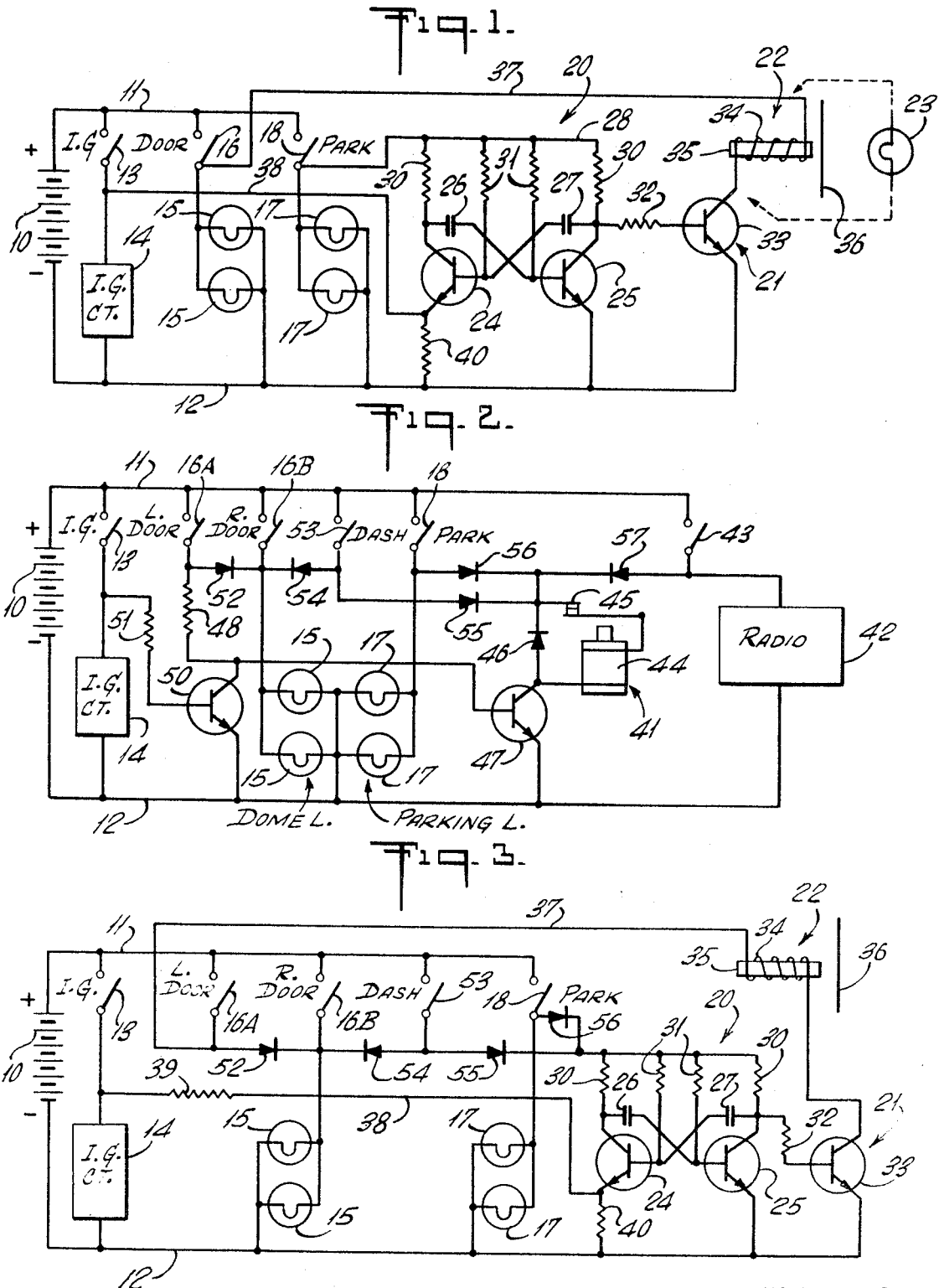

ALARM CIRCUIT

The present invention is to eliminate the discharge of a vehicle storage battery due to current drain through parking lamps, dome lamps, and auxiliary circuits which may be inadvertently left connected by an operator when the car is in a parking lot or a garage for a long time. Failure to open all light and auxiliary switches at night usually results in a dead battery and failure to start the next morning.

The present invention sounds an audible alarm only when there is a current drain, the ignition switch is turned off, and the vehicle door is opened. This is the condition of the vehicle when the driver parks his car in a garage, shuts off the motor by turning the ignition switch off, and then opens the car door to get out. If there is an auxiliary current drain, the alarm will sound. There may be times when a car is parked on a highway for a short time with the motor off and the parking lights burning. The alarm will sound when the door is opened but the operator may then get out, shut the door and turn off the alarm.

One of the features of the invention is the inclusion of the dome lamps and other "courtesy lamps" in the alarm circuit. These lamps can be turned on (on most cars) by turning the headlight switch in a counterclockwise direction. There is the possibility that these lamps may be left on when a car is parked and thereby discharge the battery.

Another feature of the invention is the use of a free-running multivibrator to actuate a sound transducer. This circuit eliminates the usual electrical contacts which are not always reliable and which produce sparks and cause pitting. The use of a multivibrator eliminates all mechanical motion from the alarm circuit except for the motion of the sound diaphragm.

For a better understanding of the present invention, together with other details and features thereof, reference is made to the following description taken in connection with the accompanying drawings:

FIG. 1 is a schematic diagram of connections showing one embodiment of the invention.

FIG. 2 is a schematic diagram of a second embodiment, showing the alarm arranged to sound only when the left door of the vehicle is opened. In this circuit an ordinary buzzer has been substituted for the multivibrator and a radio set has been added.

FIG. 3 is a schematic diagram of a third embodiment, similar to FIG. 2 but employing a multivibrator instead of a buzzer.

Referring to FIG. 1, a battery 10 is connected to a positive supply conductor 11 and a negative conductor 12 which may be grounded. An ignition switch 13 applies the battery power to an ignition circuit 14 which is always activated when the engine is running. A plurality of lamps 15, including a dome lamp and one or more door lamps, are controlled by a door switch 16 to light when the automobile door is opened. There are also a plurality of parking lamps 17 controlled by a parking switch 18 which are turned on at night when parked along a road. Parking lamps 17 also serve as running lamps when the headlamps are on, and switch 18 is closed under these conditions also. Thus, the lamps 17 are monitored whenever either the parking lamps or the headlamps are energized. The aforementioned lamps and switches are part of the equipment normally supplied with an automobile.

The alarm circuit includes a free-running multivibrator circuit 20, an amplifier stage 21, and an alarm 22, which is shown in FIGS. 1 and 3 as a vibrator for producing an audible signal. A lamp 23 can be substituted for the vibrator or both can be used together, connected in parallel. The multivibrator 20 includes two transistors 24 and 25 with the base electrode of each coupled to the collector electrode of the other by capacitors 26 and 27. The collector electrodes of each transistor are connected to a positive supply conductor 28 in series with resistors 30 while the base electrodes of both transistors are connected to the same supply conductor 28 in series with resistors 31. The emitters are connected to the negative conductor 12. The supply conductor 28 is connected to the positive terminal of the battery 10 only when the park switch 18 is closed. The output pulses of the multivibrator 20 are derived from the collector electrode of transistor 25 and are applied to the power amplifier stage base electrode in series with a limiting resistor 32. The output stage includes a transistor 33 having its collector electrode connected in series with a winding 34 while the emitter electrode is grounded.

The audible alarm 22 comprises a ferromagnetic core 35, a winding 34 around the core 35, and a magnetic diaphragm 36 adjacent to one end of the core 35. The other end of winding 34 is connected to conductor 37 and one terminal of the door switch 16. If a flashing lamp is to be used as the warning means, the multivibrator circuit is adjusted to oscillate at a frequency of five cycles per second or lower. If the diaphragm 36 is to be activated to produce an audible signal, the frequency should be set to be within the range of 30 to 500 cycles per second.

The multivibrator circuit is arranged to oscillate only when the parking light switch 18 is closed and when the ignition switch 13 is open. For this reason conductor 28 is connected to the lower portion of switch 18 so that the potential of the battery 10 will be applied to the oscillating circuit 20 only when the switch 18 is closed. Also, a connection is made by means of conductor 38 from the lower portion of the switch 13 to the emitter electrode of transistor 24 in the multivibrator circuit 20. The emitter is also connected to the ground conductor 12 by a resistor 40. The purpose of this connection is to block the operation of the multivibrator whenever the ignition switch 13 is closed. Closing the ignition switch applies the full positive potential to the emitter electrode and prevents passage of current through transistor 24. When the ignition switch is closed there is a small current flow through the resistor 40 but this occurs only when the engine is running and the current loss is of no consequence.

The operation of this circuit is as follows: when the car is in motion, the ignition switch 13 is closed and both doors are closed, keeping the door switch 16 open. The parking switch 18 may be closed or open. The alarm circuit cannot operate under these circumstances because the closed ignition switch applies a positive voltage to the emitter of transistor 24 and blocks its operation. Also, with the door switch 16 open there is no completed circuit through winding 34 to the positive terminal of the battery.

If the driver stops the car and permits a passenger to get out of the vehicle by opening one of the doors, there will still be no alarm sounded because the ignition switch is closed. However, if the driver parks the car anywhere with the parking lights on, opens the ignition switch, and then opens the door to get out, the alarm will sound and the driver will be notified that the parking lamps are taking current. With the ignition switch 13 open and the parking switch 18 closed, the multivibrator is activated and oscillates, producing a square-topped wave which is applied to the base electrode of transistor 33. As soon as the door is opened and switch 16 closed, both the aural signal device 22 and the transistor 33 are provided with power and the device operates.

The alarm circuit shown in FIG. 2 includes the same battery 10, the same ignition circuit 14 and switch 13, and the same door and parking lamps. However, in this circuit a buzzer signal device 41 is substituted for the signal means 22 shown in FIG. 1, and a radio set 42 and radio switch 43 have been added to the circuits which may produce an alarm when left on after the driver opens the left door. The buzzer 41 includes the usual magnetic winding 44 and a pair of normally closed contacts 45. A semiconductor diode 46 is bridged across the buzzer 41 to absorb the sparking at the contacts 45 when they open. The buzzer 41 is operated by current from the collector electrode of transistor 47 having its emitter connected to the ground conductor 12 and its base connected to the left door switch 16A in series with a limiting resistor 48.

In the circuit shown in FIG. 2, the ignition switch is again connected to a blocking circuit which includes a transistor 50 having its collector electrode connected to the base of transistor 47, its emitter connected to the negative conductor 12, and its base electrode connected to switch 13 in series with a limiting resistor 51. When the ignition switch 13 is closed, a positive potential is applied to the base electrode which draws a large current (when the left door is open) through resistor 48 and reduces the potential of the base of transistor 47 so that the buzzer 41 cannot operate.

The left and right door switches in most cars are connected in parallel so that opening either one turns on the dome light and other "courtesy lamps" which may include lamps near the base of the doors to illuminate a portion of the pavement. In FIG. 2, this parallel connection has been changed by the inclusion of a diode 52 between the two switches. With this connection, opening the left door sends current to the door lamps 15, lighting them and also sending current to transistor 47 (provided the ignition switch is open) to activate the buzzer 41, if either the dash switch 53, the park switch 18, or the radio switch 43 is closed.

Most modern cars in use today have a dash switch 53 which can be used to illuminate the interior of the car without opening either door. This switch is connected to a first diode 54 which carries current to the lamps 15 and to a second diode 55 which carries current to the buzzer 41. In a similar manner, the park switch 18 lights the parking lamps 17 and sends current through diode 56 to buzzer 41. The radio set and switch 43 are connected in a similar manner, diode 57 sending current to the alarm buzzer 41 when the radio switch is left on. The diodes 52, 54, 55, 56, and 57 are connected in the circuit to prevent cross actuation of similar lamp circuits and to contain the lamp currents within their intended channels.

The operation of this circuit is similar to the circuit shown in FIG. 1. Closing the ignition switch 13 blocks the buzzer circuit, as described above, and permits the warning device to operate only when the switch 13 is open. The left door switch 16A is closed when the left door (next to the driver) is opened and this action lights the door lamps 15 and energizes the warning signal by sending current through resistor 48 to transistor 47. The buzzer will be operated when (a) the ignition switch 13 is open, (b) the left door switch 16A is closed, and (c) either the dash switch 53, the park switch 18, or the radio switch 43 is closed. The right door switch 16B is connected only to the door lamps 15 and current cannot pass from switch 16B to either resistor 48 or to the buzzer 41 because of diodes 52, 54. This circuit arrangement is designed to permit an operator to stop along a highway, turn off the ignition switch, maintain the radio received in operation, and then permit a passenger to open the right hand door and leave the car without causing the operation of the alarm buzzer.

The circuit shown in FIG. 3 is similar in many respects to the circuit shown in FIG. 1 since it includes a multivibrator circuit 20, an electromagnetic warning signal 22 and a blocking signal which is transferred from the ignition switch 13 to the emitter electrode of transistor 24 in series with resistor 39. In this circuit the signal is operated only when the left door is open, the ignition switch is open and the parking or dash switches are closed. The right door switch 16B again is protected by diodes 52 and 54 so that the current through this switch travels only to energize lamps 15. The dash switch 53 sends current through diode 54 as before to light lamps 15, and through diode 55 to the multivibrator circuit 20. The park switch 18 operates as described above. While the radio circuit 42 and the radio switch 43 have been omitted from FIG. 3, it is obvious that they can be included in the warning circuit by the addition of a diode 57 as shown in FIG. 2.

A preferred set of values for the circuits shown in FIGS. 1 and 3 is as follows:

Transistor 24 - 2N3567
Transistor 25 - 2N3567
Capacitor 26 - 0.1 microfarads
Capacitor 27 - 0.15 microfarads
Resistors 30 - 330 ohms
Resistors 31 - 10,000 ohms
Resistor 32 - 1,000 ohms
Transistor 33 - 2N3567
Resistor 40 - 270 ohms A preferred set of values for the circuit shown in FIG. 2 is as follows:

Transistor 47 - 2N3567
Resistor 48 - 12,000 ohms
Transistor 50 - 2N3567
Resistor 51 - 2,000 ohms The foregoing disclosure and drawings are merely illustrative of the principles of this invention and are not to be interpreted in a limiting sense. The only limitations are to be determined from the scope of the appended claims.

What we claim is:

1. In an automobile electrical system which includes an ignition circuit with a switch therein, a source of electric power, a plurality of lamps connected to said power source and switching means for energizing said lamps, the improvement comprising:
   a. a warning circuit including pulse generating means and signaling means for generating a warning signal;
   b. first switching means connected in series with at least one lamp and the power source, said first switching means being normally open and adapted to be closed by opening a door of the vehicle to light the lamp;
   c. second switching means connected in series with at least one lamp and the power source for lighting the lamp when the second switching means is closed;
   d. electric circuit means for connecting the warning circuit to said first and second switching means, said circuit means being adapted to energize said warning circuit to generate a warning signal when both said said first and second switching means are closed and to deenergize the warning circuit when said first switching means are open and said second switching means are closed;
   e. a disabling circuit connected to the warning circuit and the ignition switch which disables the warning circuit when the ignition switch is closed; and
   f. in which said first switching means include a switch for the right-hand front door of the vehicle and a switch for the left hand front door of the vehicle for lighting the lamp and in which the circuit means includes a diode rectifier which prevents one of said switches when closed from energizing the warning circuit.

2. A structure as specified in claim 1 in which said second switching means includes a plurality of switches and in which said circuit means includes a diode rectifier for each switch which prevents said second switching means from energizing the warning circuit when said second switching means are closed and said first switching means open.